(12) United States Patent
Kanezawa et al.

(10) Patent No.: US 7,815,415 B2
(45) Date of Patent: Oct. 19, 2010

(54) MOUNTING STRUCTURE FOR AIR SEPARATOR, AND GAS TURBINE

(75) Inventors: Yoshiyuki Kanezawa, Hyogo-ken (JP); Masao Terazaki, Hyogo-ken (JP)

(73) Assignee: Mitsubishi Heavy Industries, Ltd, Tokyo (JP)

(*) Notice: Subject to any disclaimer, the term of this patent is extended or adjusted under 35 U.S.C. 154(b) by 823 days.

(21) Appl. No.: 11/236,883

(22) Filed: Sep. 28, 2005

(65) Prior Publication Data

US 2006/0133924 A1 Jun. 22, 2006

(30) Foreign Application Priority Data

Sep. 29, 2004 (JP) .............................. 2004-285043

(51) Int. Cl.
*F01D 11/00* (2006.01)
*F02C 7/12* (2006.01)

(52) U.S. Cl. ...................................... 415/170.1; 60/806

(58) Field of Classification Search .................. 60/796, 60/797, 805; 415/115, 116, 170.1, 171.1
See application file for complete search history.

(56) References Cited

U.S. PATENT DOCUMENTS

| | | | |
|---|---|---|---|
| 3,644,058 A * | 2/1972 | Barnabei et al. | 416/95 |
| 3,888,602 A | 6/1975 | Nichols et al. | |
| 4,691,927 A * | 9/1987 | Sudol et al. | 277/360 |
| 4,820,116 A | 4/1989 | Hovan et al. | |
| 6,151,881 A | 11/2000 | Aj et al. | |
| 6,804,875 B2 * | 10/2004 | Taniguchi et al. | 29/596 |
| 2002/0067987 A1 * | 6/2002 | Toborg et al. | 415/170.1 |
| 2005/0271504 A1 * | 12/2005 | Ferra | 415/170.1 |
| 2007/0098545 A1 * | 5/2007 | Alvanos et al. | 415/170.1 |

FOREIGN PATENT DOCUMENTS

| | | |
|---|---|---|
| CA | 2 264 282 | 3/2002 |
| CH | 591 634 D2 | 9/1977 |
| EP | 0 867 599 A2 | 9/1998 |
| EP | 0 927 813 B1 | 10/2003 |

(Continued)

OTHER PUBLICATIONS

German Office Action and English Translation.
Fujio Oguri and Tatsuo Oguri, "Machine Design Known-How Series", Guide Book for Taboos in Machine Design, p. 147-148 (see section "16.9 change in interference due to difference in heat expansion").

(Continued)

*Primary Examiner*—William H Rodríguez
*Assistant Examiner*—Gerald L Sung
(74) *Attorney, Agent, or Firm*—Lowe, Hauptman, Ham & Berner, LLP (57) ABSTRACT

A mounting structure for an air separator in a gas turbine includes an air separator and a rotor blade rotary disk. The air separator includes a cylindrical member with a flange at one end. The rotor blade rotary disk has on its outer face a disk recess portion forming an annular recess around the axial center of the rotor. A sealing face is formed on a contact face between a flange outer peripheral face that is provided on an outer periphery of the flange to be parallel to the axial center of the rotor and a disk recess inner peripheral face opposed to the flange outer peripheral face, that is provided on the disk recess portion and is parallel to the axial center of the rotor and formed around the axial center in an annular shape.

8 Claims, 6 Drawing Sheets

FOREIGN PATENT DOCUMENTS

| | | |
|---|---|---|
| JP | 11-013407 | 1/1999 |
| JP | 11-013407 A | 1/1999 |
| JP | 11-013408 | 1/1999 |
| JP | 11-013408 A | 1/1999 |

OTHER PUBLICATIONS

Japanese Office Action for application No. 2004-285043, mailed Apr. 20, 2010.

* cited by examiner

- 22
- 20
- 3
- MINIMUM INTERFERENCE (Z)
- 2
- 32
- 30
- AXIAL CENTER OF ROTOR
- FLANGE MAXIMUM OUTER DIAMETER SIZE
- DISK RECESS MINIMUM INNER DIAMETER SIZE
- DISK RECESS MAXIMUM INNER DIAMETER SIZE (Y)
- FLANGE MINIMUM OUTER DIAMETER SIZE (X)

MOUNTING STRUCTURE FOR AIR SEPARATOR, AND GAS TURBINE

BACKGROUND OF THE INVENTION

1. Field of the Invention

The present invention relates to a mounting structure for an air separator that supplies air for cooling a rotor blade in a gas turbine.

2. Description of the Related Art

A mounting structure for an air separator includes an air separator and a rotor blade rotary disk. The mounting structure takes a portion of compressed air that is compressed by a compressor, and supplies the compressed air as cooling air to the rotor blade.

Figure 8:
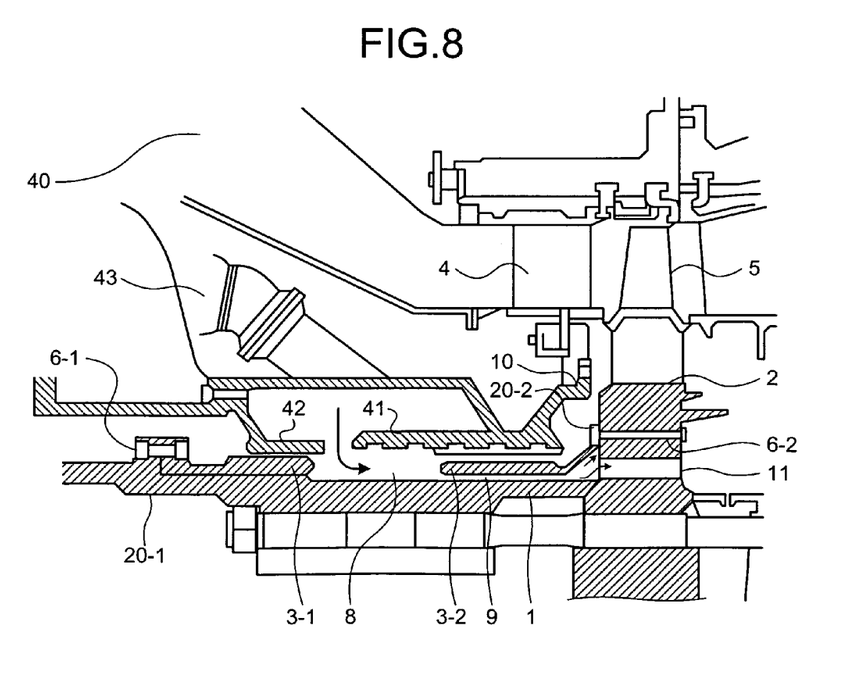
FIG. 8 is a cross-section of a portion around a an air separator of a conventional gas turbine.

FIG. 8 is a cross section of a gas turbine around a conventional air separator disclosed in, for example, Japanese Patent Application Laid-open No. H11-013408. The gas turbine includes a first stage stator blade 4 and a first stage rotor blade 5, an air separator 3-2, a rotor 1, a compressor (not shown), and a cooler (not shown). A portion of air compressed by the compressor and cooled by the cooler is taken in from a rotor side opening 8 via a clearance 9 between the air separator 3-2 and the rotor 1, and further introduced into inside of the first stage rotor blade 5 via radial holes 10 and cooling air holes 11 of a rotor blade rotary disk 2 to air-cooled the first stage rotor blade 5. The rotor blade rotary disk 2 having the first stage rotor blade 5 embedded at a peripheral end thereof is mounted on the rotor 1 so that the rotor blade rotary disk 2 is rotated together with the rotor 1. On the other hand, the air separators 3-1 and 3-2 are constituted of a pair of cylindrical members separated from each other, one ends thereof being provided with flanges 20-1 and 20-2 for fixing the air separators 3-1 and 3-2 and the other ends thereof being positioned adjacent to the opening 8 for introduction of cooling air. One air separator 3-1 is fixed to the rotor 1 via the flange 20-1 by a bolt and nut set 6-1, while the other air separator 3-2 is fixed to the rotor blade rotary disk 2 via the flange 20-2 by a bolt and nut set 6-2, so that these separators are rotated integrally with the rotor 1 and the rotor blade rotary disk 2. A portion of cooling air fed from a compressor (not shown) via an air duct 43 is taken in from the opening 8 formed between sealing portions 41 and 42 into the air separator 3-2. Furthermore, the cooling air is supplied to a cooling air hole 11 provided in the rotor blade rotary disk 2 through the clearance 9 provided between the rotor 1 and the air separator 3-2, and is also supplied to the radial hole 10 through an air hole (not shown) provided in the flange 20-2 of the air separator 3-2, so that the air is finally supplied to respective rotor blades.

Figure 9:
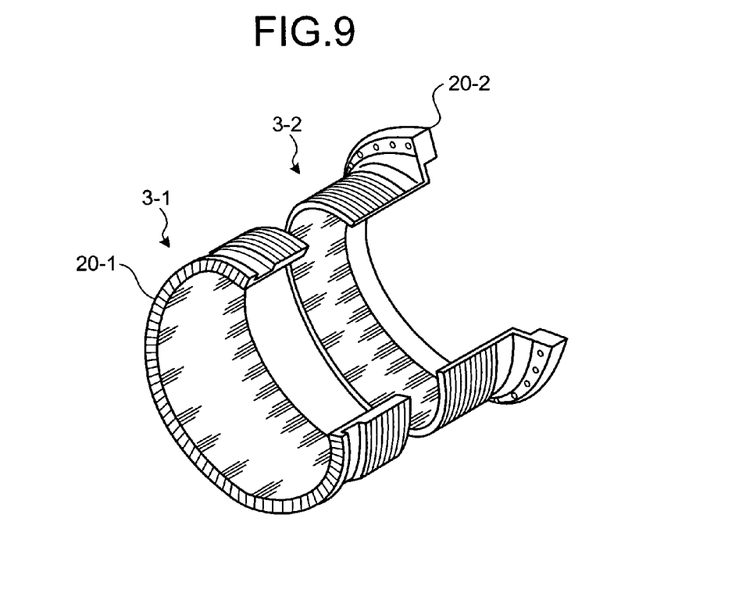
FIG. 9 is a perspective cut view of an air separator shown in FIG. 8.

FIG. 9 is a perspective of the separator 3-2. In the flange 20-2 of the air separator 3-2 fixed to the rotor blade rotary disk 2 by the set of a bolt and a nut 6-2, when leakage of cooling air taken in via the clearance 9 between the rotor 1 and the air separator 3-2 occurs, the cooling air cannot be supplied up to a distal end of the rotor blade sufficiently, which can damage the rotor blade due to cooling deficiency. Therefore, an outer face of the rotor blade rotary disk 2 and a contact face of the flange 20-2 are brought in close contact with each other by fastening the flange 20-2 to the rotor blade rotary disk 2 using the bolt and nut set 6-2, and sealing is performed by a fastening force of the bolt and nut set 6-2, so that occurrences of air leakage are prevented at the flange.

On the other hand, when the gas turbine runs again after stopping, a hot start operation is often performed. The term "hot start operation" means an operation for causing a gas turbine (apparatus) to run again while respective portions in the gas turbine are still relative hot (for example, about 200° C.) after the apparatus is stopped.

Figure 10:
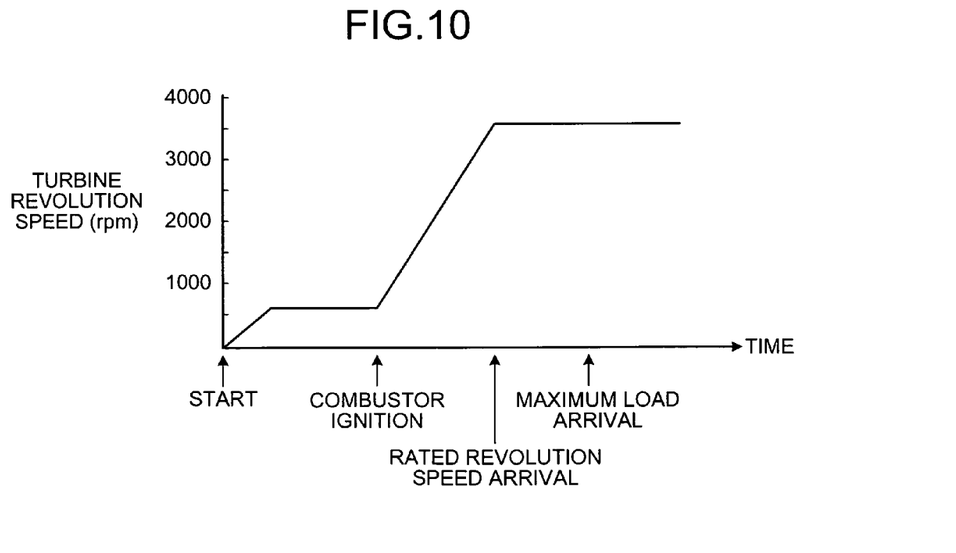
FIG. 10 depicts a change in gas turbine revolution speed with time during hot start operation.
Figure 11:
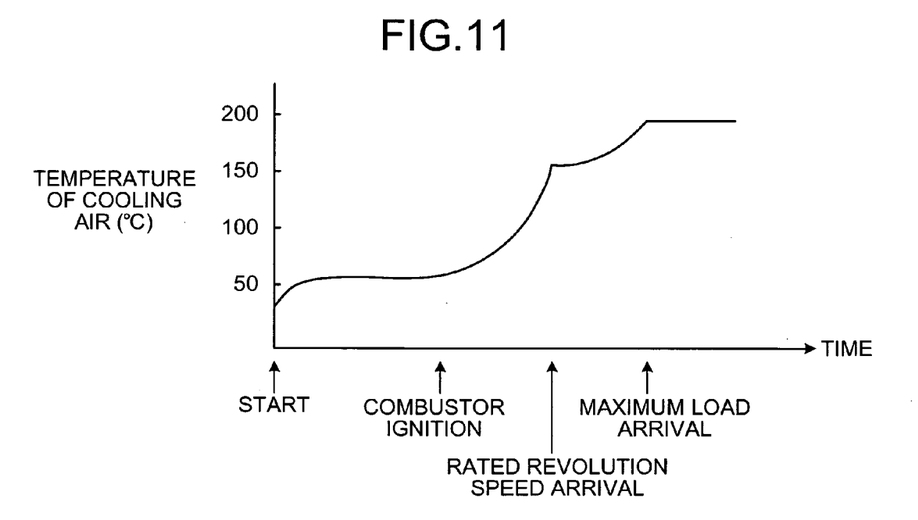
FIG. 11 depicts a change in cooling air temperature with time during the hot start operation.

Operation statuses during the hot start operation will be explained with reference to FIGS. 10 and 11. FIG. 10 is a graph of change of a turbine revolution speed during the hot start operation from an operation start time along with time elapse. In FIG. 10, vertical axis represents the turbine revolution speed, while horizontal axis represents time elapsed from the operation start time. Main items of the operation statuses from the operation start up to a steady operation are represented on the horizontal axis. Purge operation with a constant turbine revolution speed (for example, 500 to 600 revolutions per minute (rpm)) within the apparatus is conducted for a predetermined time from the gas turbine operation start. Thereafter, a combustor is ignited and the turbine revolution speed is further increased up to a rated speed (for example 3600 rpm), while increasing the amount of fuel. After the turbine revolution speed reaches the rated speed, output is further increased by increasing fuel so that it is shifted to the steady operation (maximum load operation). The hot start operation of the gas turbine is performed in this manner.

Change of a temperature of cooling air along with time elapse corresponding to the hot start operation of the gas turbine will be explained with reference to FIG. 11. In FIG. 11, vertical axis represents a temperature of cooling air leaving the cooler (not shown) from the compressor (not shown) to flow in the air separator, while horizontal axis represents time elapsing from an operation start. After the gas turbine is activated, during the purge operation, the temperature is kept about 50 to 60° C. After the combustor is ignited, an air temperature also rises along with increase in turbine revolution speed, and the air temperature reaches about 150 to 160° C., when the revolution speed reaches the rated speed. Thereafter, although the air temperature further rises along with increase in the amount of fuel for increasing output in the combustor, the temperature is kept at a predetermined temperature of about 200° C., when the operation reaches a maximum load operation. The temperature of cooling air flowing in the air separator changes rapidly from the operation start in this manner, while the cooling air flows from the opening 8 into the air separator 3-2 to be supplied to the radial hole 10 and the cooling air hole 11 via the clearance 9 and fed to respective rotor blades, as shown in FIG. 8.

Figure 12:
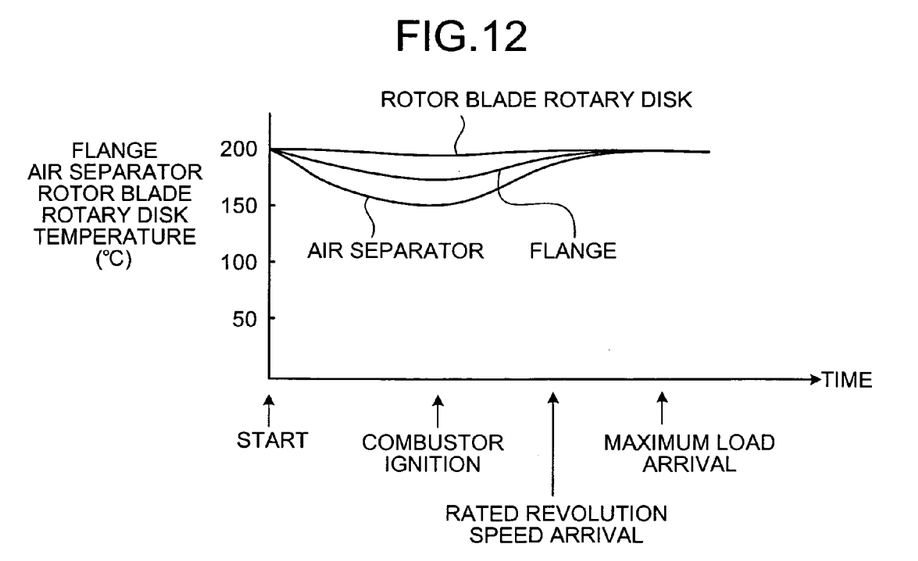
FIG. 12 depicts a change in temperature of the rotor blade rotary disk and the flange during the hot start operation.

However, because temperature change of cooling air flowing in the air separator is large during the hot start operation of the gas turbine, the following problems can occur. That is, because the air separator is constituted of a cylindrical member thinner than the rotor blade rotary disk that is a large-sized member, a heat capacity of the former is smaller than of the latter. As shown in FIG. 12, therefore, a temperature of the air separator drops along with time elapse in an initial stage of the hot start operation and it becomes the lowest temperature just after ignition; however, temperature drop of the rotor blade rotary disk is relatively small. That is, the flange of the air separator causes thermal contraction toward a radially central direction along with the temperature drop. On the other hand, because temperature drop of the rotor blade rotary disk is small, its thermal contraction in the radial direction hardly occurs. This results in relative displacement on a contact face between the flange and the rotor blade rotary disk in the radial direction due to a difference in degree of thermal contraction between the both. Furthermore, because the fastened bolt is maintained at the same high temperature as that of the rotor blade rotary disk, it is kept in an expanded state, however, the temperature of the flange decreases due to the cooling air and it shrinks in a thickness direction thereof. Therefore, the bolt itself is put in a relatively expanded state so that its fastening force is reduced. That is, the relative displacement in a radially central direction and the reduction in a bolt fastening force due to the difference in thermal contraction are simultaneously generated on a contact face of the flange and the rotor blade rotary disk along with the temperature lowing of the flange, so that air leakage easily occur on the contact face of the flange. That is, when a rapid temperature change is caused, as in such a hot start operation, the method for performing sealing using the bolt fastening force has such a problem that air leakage easily occurs and vibrations of the air separator are easily generated.

SUMMARY OF THE INVENTION

It is an object of the present invention to at least solve the problems in the conventional technology.

According to an aspect of the present invention, a mounting structure for an air separator in a gas turbine includes an air separator that is a cylindrical member arranged so as to form a clearance communicating with an opening to an outer peripheral face of a rotor and has a flange at one end thereof; and a rotor blade rotary disk that is provided on an outer surface thereof with a disk recess portion forming an annular recess around the axial center of the rotor. A sealing face is formed on a contact face between a flange outer peripheral face that is provided on an outer periphery of the flange and is parallel to the axial center of the rotor and a disk recess inner peripheral face opposed to the flange outer peripheral face, that is provided in the disk recess portion and that is parallel to the axial center of the rotor and formed around the axial center in an annular shape.

According to another aspect of the present invention, a mounting structure for an air separator in a gas turbine includes an air separator that is a cylindrical member arranged so as to form a clearance communicating with an opening to an outer peripheral face of a rotor and that has a flange at one end thereof; and a rotor blade rotary disk that is provided on an outer surface thereof with a disk recess portion forming an annular recess around the axial center of the rotor. Moreover, a fitting structure between the flange and the disk recess portion is an interference fit.

According to still another aspect of the present invention, a gas turbine includes a mounting structure for an air separator according to the present invention.

According to still another aspect of the present invention, a mounting method of an air separator in a gas turbine that has a structure for supplying cooling air to a rotor blade rotary disk, wherein a flange provided on one end of the air separator is inserted and fitted into a disk recess portion provided on an outer face of the rotor blade rotary disk using an interference fit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The embodiments explained below are only illustrative and not restrictive, and all equivalents are included in the invention, as long as they have configurations according to the invention.

Figure 1:
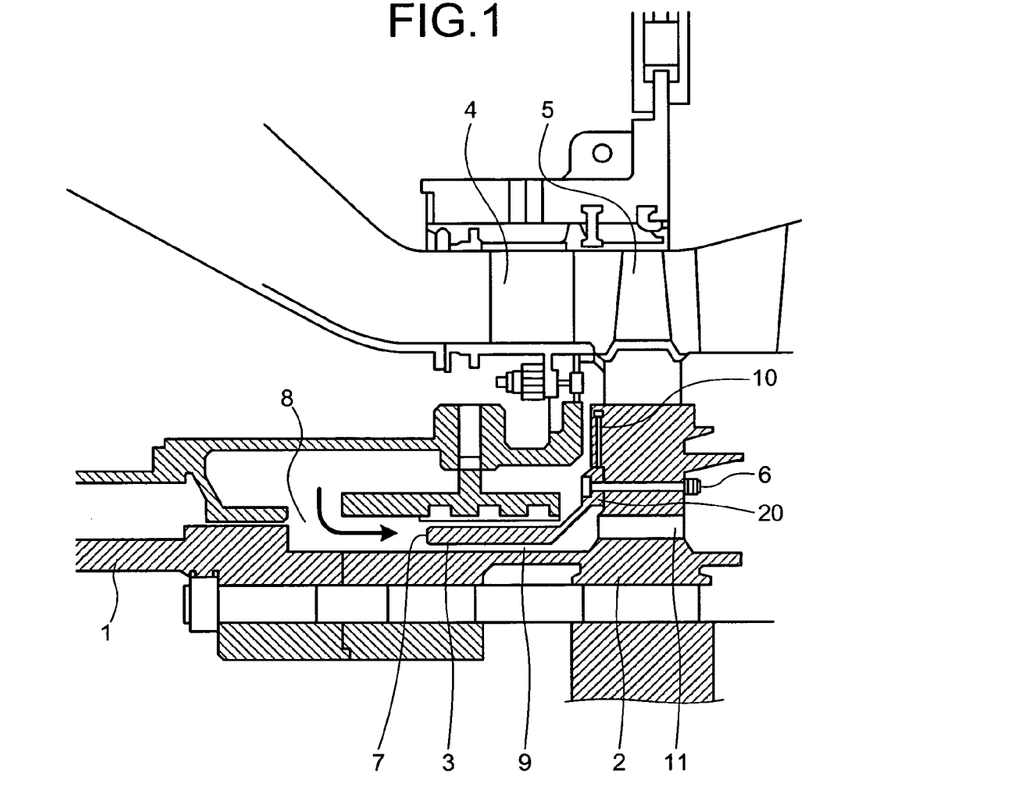
FIG. 1 is a cross-section of a portion around an air separator of a gas turbine according to an embodiment of the present invention.
Figure 2:
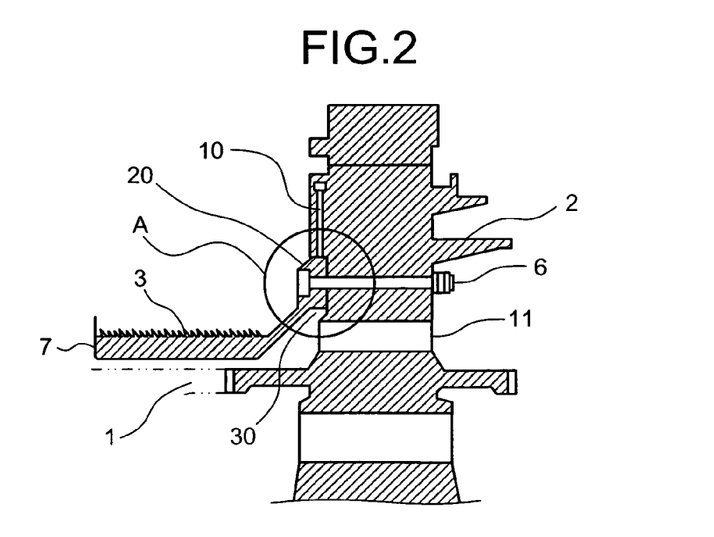
FIG. 2 is a cross-section of a portion around a mounting structure of the air separator shown in FIG. 1.

A mounting structure for an air separator according to the present invention will be explained with reference to FIG. 1. The mounting structure for an air separator includes a rotor blade rotary disk 2 and an air separator 3. The air separator 3, as shown in FIG. 2, is a cylindrical member having a flange 20 at one end thereof. The air separator 3 covers a rotor 1. The air separator 3 is fixed to the rotor blade rotary disk 2 via the flange 20 by using a bolt and nut set 6. The rotor blade rotary disk 2 and the air separator 3 are rotated integrally with the rotor 1. As air for rotor blade cooling, a portion of compressed air that is output from a compressor (not shown) and is cooled via a cooler (not shown) is used. That is, the portion of compressed air cooled is introduced from an opening 8 adjacent to the air separator 3 into the air separator 3. Air for rotor blade cooling introduced into the air separator 3 is supplied to a radial hole 10 and a cooling air hole 11 provided in the rotor blade rotary disk 2 through a clearance 9 between the rotor 1 and the air separator 3 and it is finally supplied to respective rotor blades.

A structural view of a section around the mounting structure for an air separator according to the present invention is shown in FIG. 2. An annular disk recess portion 30 around the axial center of the rotor 1 is formed on an outer surface of the rotor blade rotary disk 2 on the side of the air separator, the flange 20 of the air separator 3 is inserted and fitted into the disk recess portion 30, and the flange 20 is fixed to the rotor blade rotary disk 2 using the bolt and nut set 6. An interference fit is used as a fitting structure between the flange 20 and the disk recess portion 30. The air separator 3 is a thin cylindrical member, one end thereof being provided with the flange 20 and the other end thereof being defined with an edge 7 of an opening, so that cooling air is introduced from the opening and the cooling air is supplied to the radial hole 10 and the cooling air hole 11. The flange 20 is provided with air holes (not shown) for supplying air to the radial hole 11 like the conventional air separator.

Figure 3:
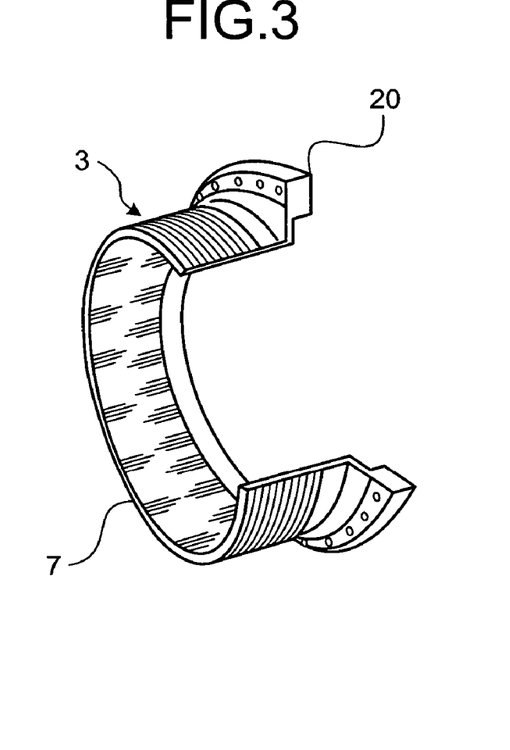
FIG. 3 is a perspective cut view of the air separator shown in FIG. 1.

A structure of the air separator according to the present invention is shown in FIG. 3. Because the air separator 3 is a single cylindrical member, its structure is simpler than that of the conventional air separator of a split type, so that the number of assembling steps can be reduced and cost advantage can be achieved.

Figure 4:
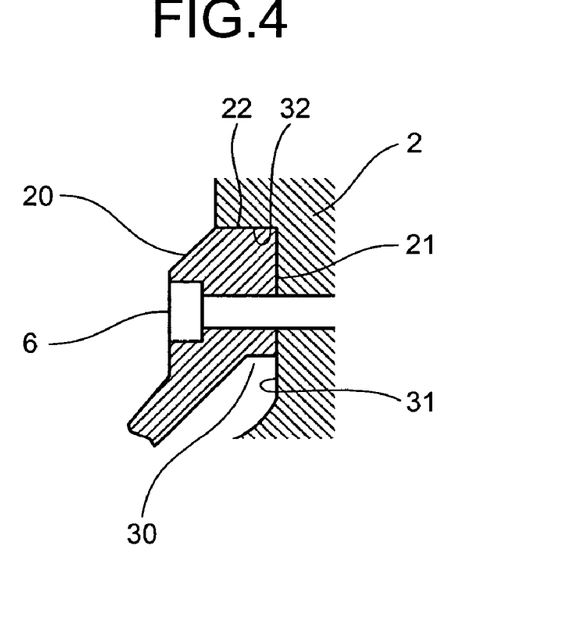
FIG. 4 is a cross-section of a portion A shown in FIG. 2.

FIG. 4 is a cross-section of the portion A shown in FIG. 2. The flange 20 is defined by a flange outer peripheral face 22 provided at an outer periphery of the flange 20 to be parallel to the axial center of the rotor 1 and a flange end face 21 orthogonal to the flange outer peripheral face 22. On the other hand, the disk recess portion 30 is an annular recess around the axial center of the rotor 1, and it is defined by a disk recess inner peripheral face 32 provided on an annular wall face of the disk recess portion 30 and a disk recess bottom face 31 orthogonal to the disk recess inner peripheral face 32 to form a bottom of the disk recess portion 30. The flange outer peripheral face 22 and the disk recess inner peripheral face 32 opposed thereto are brought into internal contact with each other to form an annular contact face around the axial center of the rotor.

The flange end face 21 and the disk recess bottom face 31 opposed thereto are brought into contact with each other to form an annular contact face around the axial center of the rotor on a face adjacent to the disk recess inner peripheral face 32 and orthogonal to the disk recess bottom face 31. The flange 20 is fitted into the disk recess portion 30 and it is further fixed to the rotor blade rotary disk 2 on the annular contact face using the bolt and nut set 6.

Next, a coupling method of the flange and the disk recess portion will be explained. In the conventional air separator, a flange end face is fastened to an outer peripheral face of a rotor blade rotary disk using a bolt and nut set. Therefore, an area pressure acting on a contact face between the flange end face and the disk outer face is increased by a fastening force of the bolt and nut so that occurrences of air leakage are prevented.

On the other hand, as shown in FIG. 4, the present invention is different from the conventional coupling method in that the annular disk recess portion 30 around the axial center of the rotor is provided on the outer surface of the rotor blade rotary disk, the fitting structure is applied to the flange 20 of the air separator and the disk recess portion 30, and the flange 20 is fixed to the rotor blade rotary disk 2 by fitting the flange 20 into the disk recess portion 30, so that the degree of close contact between the flange 20 and the rotor blade rotary disk 2 is improved.

That is, in the present invention, the flange 20 of the air separator is manufactured such that the minimum outer diameter size of the flange outer peripheral face 22 thereof is slightly larger than the maximum inner diameter size of the disk recess inner peripheral face 32 provided on the rotor blade rotary disk, and an interference fit where the minimum interference always becomes plus (+) is adopted as the fitting structure between the flange 20 and the disk recess portion 30.

Figure 5:
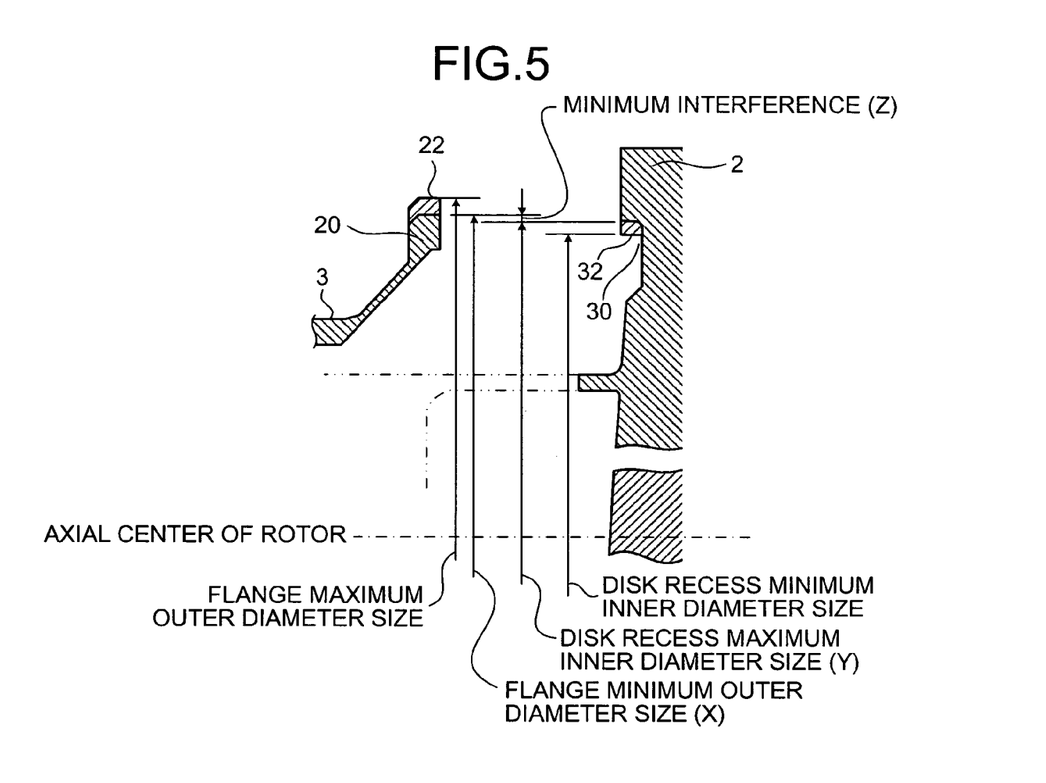
FIG. 5 is a cross-section around a flange and a disk recess portion.

FIG. 5 is a graph of a relationship in interference between the disk recess portion and the flange. Manufacturing sizes of the flange 20 and the disk recess portion 30 include variations within manufacture tolerances. Specifically, in FIG. 5, it is assumed that as regards an outer diameter size of the flange outer peripheral face 22, the minimum finishing size within the manufacture tolerance is the flange minimum outer diameter size (X) and as regards an inner diametrical size of the disk recess inner peripheral face 32, the maximum finishing size within the manufacture tolerance is the disk recess maximum inner diameter size (Y). In this case, the minimum interference (Z) between the flange 20 and the disk recess portion 30 is expressed as a difference between the flange minimum outer diameter size (X) and the disk recess maximum inner diameter size (Y), namely, Z=X−Y. When the fitting structure is an interference fit, because the flange minimum outer diameter size (X) is always larger than the disk recess maximum inner diameter size (Y) (X>Y), the minimum interference (Z) always becomes plus (+).

Regarding the interference between the flange and the disk recess portion during operation of the gas turbine, a final interference between the flange and the disk recess portion is determined based on not only an interference therebetween at an assembling time of a turbine but also a difference in thermal expansion and contraction between the flange and the rotor blade rotary disk during operation and expansion due to a centrifugal force generated along with the rotation of the turbine.

The thermal expansion and contraction of the flange of the air separator and the rotor blade rotary disk during the hot start operation will be explained first.

As shown in FIG. 12, the maximum temperature difference between the rotor blade rotary disk and the air separator occurs just after igniting the combustor, and the maximum temperature difference value is in the range of about 40 to 50° C. However, a temperature difference between the flange and the disk recess portion is smaller than the former value. That is, because the fitting structure between the flange and the disk recess portion is constituted as the interference fit, the flange outer peripheral face and the disk recess inner peripheral face opposed thereto are put in close contact with each other even at a time of hot start operation.

Therefore, even when temperature drop occurs at the cylindrical portion of the air separator due to introduction of cooling air after the operation start, the flange is kept in close contact with the disk recess portion, so that heat transfer from the disk recess portion of the rotor blade rotary disk with reduced temperature change to the flange occurs due to heat conduction.

As shown in FIG. 12, therefore, the maximum temperature difference between the rotor blade rotary disk and the flange is smaller than that between the rotor blade rotary disk and the cylindrical portion of the air separator, and the temperature difference therebetween will fall in a range of about 20 to 25° C. just after igniting the combustor.

In this case, because the temperature drop of the rotor blade rotary disk is small, the inner diameter size of the disk recess inner peripheral face hardly changes, however, the outer diametrical size of the flange outer peripheral face thermally contracts due to the temperature drop of the flange, so that relative movement of the disk recess inner peripheral face and the flange outer peripheral face occurs in a direction in which a gap is generated therebetween. A gap amount "a" between the flange and the disk recess portion is calculated by the following Equation (1).

$$a = R\alpha(T_1 - T_2) \quad (1)$$

where, R represents a radius, α represents a coefficient of linear expansion of material to be used, and T1 and T2 represent temperatures of the disk recess portion and the flange, respectively. The "a" calculated by the Equation (1) shows a difference in contraction amount between the disk recess portion and the flange due to a temperature difference therebetween, namely, a gap amount occurring between the disk recess inner peripheral face and the flange outer peripheral face.

On the other hand, the air separator and the rotor blade rotary disk are rotated integrally with the rotor, and expansion occurs in each rotary body, namely the air separator, the rotor blade rotary disk, or the rotor, in a radial direction thereof due to a centrifugal force according to rotation. An expansion amount (b) of an outer edge portion of the rotary body in a radially outward direction due to the centrifugal force of the rotary body is calculated by the following Equation (2).

$$b = KR\gamma\omega^2/E \quad (2)$$

where R represents a radius, γ represents specific gravity of material to be used, ω represents a turbine revolution speed, E represents Young's modulus, and K represents a coefficient.

Figure 6:
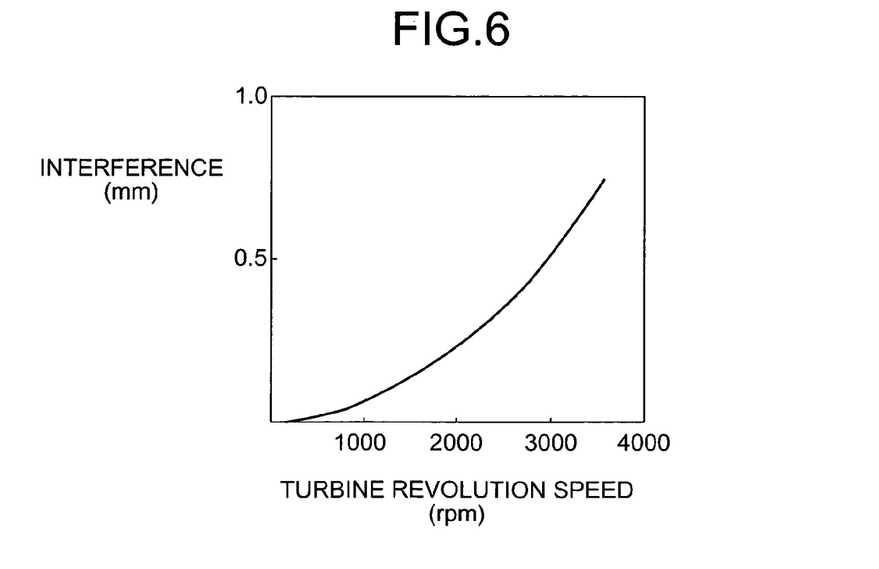
FIG. 6 is a graph of a relationship of a turbine revolution speed and interference between the flange and the disk recess portion due to a centrifugal force during a hot start operation.

A cylindrical or hollow rotary body and a solid rotary body are different in expansion in the radial direction due to the centrifugal force even if they have the same outer diameter size and the former is larger in relative expansion than the latter. In the present invention, therefore, the air separator is larger in expansion than the rotor blade rotary disk. Accordingly, when the rotor blade rotary disk and the air separator are rotated integrally, the flange portion of the air separator becomes larger in expansion in a radial direction than the rotor blade rotary disk. However, when the flange outer peripheral face comes in contacts with the disk recess inner peripheral face so that expansion thereof is restricted in the radially outward direction, a pressing force from the disk recess inner peripheral face acts on the flange outer peripheral face due to a centrifugal force between the disk recess inner peripheral face and the flange outer peripheral face, which results in occurrence of plus (+) interference. When the turbine revolution speed increases, the interference also increases. Specifically, respective expansion amounts of the flange outer peripheral face and the disk recess inner face are calculated by the Equation (2). A difference between the expansion amounts depending on a difference in shape is converted to interference. A relationship between the interference occurring between the flange and the disk recess portion due to the centrifugal force and the turbine revolution speed is shown in FIG. 6.

As described above, a gap (minus (−) interference) calculated by the Equation (1) occurs between the disk recess inner peripheral face and the flange outer peripheral face due to a difference in thermal contraction between the flange portion and the rotor blade rotary disk. On the other hand, as shown in FIG. 6, a plus (+) interference due to the centrifugal force occurs between the disk recess inner peripheral face and the flange outer peripheral face by the Equation (2). Accordingly, when the plus (+) interference due to the centrifugal force is larger than the minus (−) interference due to thermal contraction, a plus (+) interference can always be secured between the disk recess inner peripheral face and the flange outer peripheral face.

Figure 7:
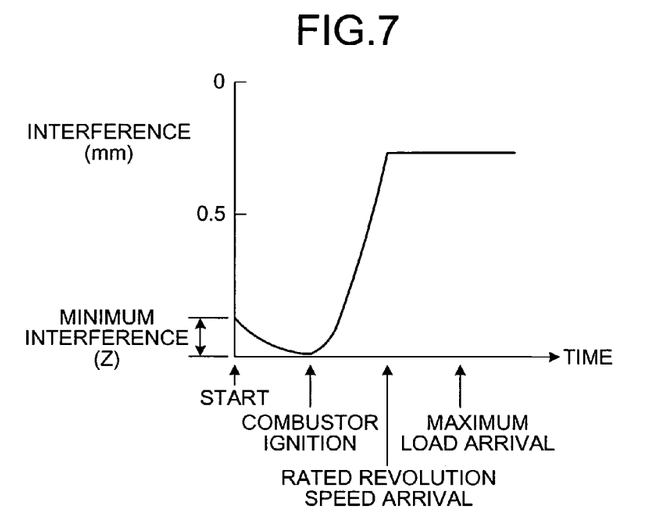
FIG. 7 is a graph of change of interference between the flange and the disk recess portion along with time elapse during the hot start operation.

When the flange is assembled to the disk recess portion during the turbine assembling, further reliable interference can be secured by using the interference fit for fitting and fixing of these members. The interference is most reduced just after ignition of the combustor for the hot start operation, which can result in a minus (−) interference. Assuming such a minus interference, such a fitting interference that a plus (+) minimum interference is obtained can be set at a time of assembling in advance. Thus, the interference between the flange and the disk recess portion during the operation is determined considering the thermal contraction and the centrifugal force. The interference between the flange and the disk recess portion at the hot start operation time along with time elapse from the operation start time is shown as one example in FIG. 7.

As described above, by adopting the interference fit as the fitting structure between the flange and the disk recess portion and adopting such a structure that the plus (+) minimum interference is provided at the turbine assembling time, the contact face between the flange outer peripheral face and the disk recess inner peripheral face can always be kept in their close contact state over all the steps from the starting time of the hot start operation to the steady operation, so that adverse influences due to rapid drop of air temperature at the flange can be suppressed. Because the close contact state can always be kept, even if a bolt fastening force becomes weak, vibrations can be prevented due to loosening of the air separator, and prevention of rotor vibration can be achieved.

A sealing effect between the flange and the disk recess portion constituting the mounting structure for an air separator will explained next, while comparing the air separator of the invention with a conventional air separator.

In the conventional air separator, a pressure of the contact face between the flange end face and the disk outer face is increased according to increase in a fastening force between a bolt and a nut to form a sealing face on the disk outer face, so that occurrences of air leakage are prevented by the whole contact face. In the mounting structure for an air separator according to the embodiment, the flange is inserted in the disk recess portion and fitted therein by the interference fit, and the flange outer peripheral face is pressed on the disk recess inner peripheral face according to the centrifugal force, while a plus (+) interference is always generated during these processes. Thereby, a sealing face is formed on the contact face so that air leakage is prevented.

As a result, even if the bolt fastening force becomes weak and the contact area pressure becomes small due to a difference in thermal contraction during hot start operation between the flange and the disk recess portion, which can result in occurrence of air leakage, because a sealing face is always formed on the contact face between the flange outer peripheral face and the disk recess inner peripheral face orthogonal to each other, occurrences of air leakage are prevented.

When a plus (+) interference is always maintained on the contact face between the flange and the disk recess portion, the interference is further increased according to increase of the revolution speed and the contact area pressure is increased, so that a reliable sealing effect can always be expected from the operation start time to the steady operation time. Such a sealing effect cannot be expected in the conventional air separator.

TABLE 1

| Item | Numerical value |
| --- | --- |
| Flange outer peripheral face outer diameter size | 1300 + 0.05 mm |
| Disk recess inner peripheral face inner diameter size | 1300 mm − 0.05 mm |
| Minimum interference | 0.1 mm |
| Inserting and fitting process | Cooling fit |
| Specific gravity of material | 7.6 |

A specific example of the present invention is shown in Table 1; however, a mounting structure is not limited to the example.

As means for inserting and fitting the flange into the disk recess portion, an existing pressure-fitting unit or a cooling fit can be adopted. When a fitting structure where the minimum interference is large is desired, a cooling interference is advantageous. While the cooling fit is used as the means for inserting and fitting the flange into the disk recess portion in the example, a pressure-fitting unit can be also adopted. Because existing pressure-fitting jig such as a hydraulic tool can be used, the pressure-fitting unit is further simplified.

Thus, improvement in sealing effect between the flange and the disk recess portion can be improved due to formation of the sealing face on the contact face of the flange outer peripheral face and the disk recess inner peripheral face. Because the flange is inserted and fitted into the disk recess portion with the interference fit so that the plus (+) interference can always be secured, even if temperature change is large during the hot start operation, the sealing face is always formed on the contact face, so that air leakage can be prevented and vibrations of the air separator can be also prevented from occurring over all steps from the operation start time to the steady operation time.

Moreover, even if the temperature of the air separator drops rapidly in an initial stage of the hot start operation, because the fitting between the flange and the disk recess portion forms the interference fit, the both are always brought in close contact with each other so that occurrences of air leakage can be reliably prevented from the flange. Because any gap is not formed between the flange outer peripheral face and the inner peripheral face of the disk recess portion, any vibration of the air separator is not generated and vibrations of the rotor can also be prevented.

Furthermore, because the cooling fit is adopted as the interference fit, the present invention can be applied to the interference fit with a large minimum interference, so that the degree of close contact between the flange and the disk recess portion is improved, and the sealing effect is further improved.

Moreover, air leakage from the flange of the air separator is avoided, so that safety of the gas turbine is improved, which allows a long term operation.

According to the mounting method of the present invention, because the flange is mounted on the disk recess portion by the interference fit, the degree of close contact on the contact face is increased, and air leakage can be prevented. Accordingly, vibrations of the air separator are prevented.

According to the method of the present invention, because the cooling fit is adopted as the interference fit, the degree of close contact between the flange and the disk recess portion is further increased, so that further sealing effect can be obtained.

According to the method of the present invention, because a sealing face is always formed on the contact face between the flange and the disk recess portion over all the steps from the operation start time of the hot start operation to the steady operation, further reliable sealing effect can be expected and safety operation is made possible.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mounting structure in a gas turbine, comprising:
    an air separator that includes a cylindrical member arranged to form a clearance communicating with an opening to an outer peripheral face of a rotor in a radial direction of the rotor, the cylindrical member having a flange at one end and the other end being defined by an edge of the opening; and
    a rotor blade rotary disk disposed on an outer face of the rotor and formed on an upstream end of the rotor with respect to an axial flow direction of core gases, the rotor blade rotary disk having a disk recess portion forming an annular recess around the axial center of the rotor;
    a flange outer peripheral face disposed on an outer periphery of the flange, the flange outer peripheral face formed on a downstream end of the flange with respect to an axial flow direction of core gases, is parallel to the axial center of the rotor, and is tightly sealed with a disk recess inner peripheral face opposed to the flange outer peripheral face to form a wall of an air passage configured to provide cooling air to turbine blades and to reduce air leakage from the air passage,
    wherein the disk recess inner peripheral face is formed on an upstream end of the rotor blade rotary disk with respect to an axial flow direction of core gases, is disposed in the disk recess portion, is parallel to the axial center of the rotor, and is formed around the axial center in an annular shape; and
    wherein the clearance is formed in an inner side of the flange outer peripheral face,
    the flange outer peripheral face is placed on an outer peripheral side of the disk recess portion and is secured to the rotor blade disk at the outer peripheral side of the disk recess portion, and
    the portion of the flange in contact with the rotary disk is entirely in face to face contact with the rotary disk.

2. The mounting structure according to claim 1, wherein the flange includes an arrangement that makes the flange insertable and fittable into the disk recess portion using a cooling fit.

3. The mounting structure accordingly to claim 1, wherein a fitting structure disposed between the flange and the disk recess portion is an interference fit.

4. The mounting structure according to claim 3, wherein the flange includes an arrangement that makes the flange insertable and fittable into the disk recess portion using a cooling fit.

5. A gas turbine comprising a mounting structure for an air separator, wherein the mounting structure includes:
    an air separator that is a cylindrical member arranged so as to form a clearance communicating with an opening to an outer peripheral face of a rotor in a radial direction of the rotor and has a flange at one end and the other end being defined by an edge of the opening; and
    a rotor blade rotary disk disposed on an outer face of the rotor and formed on an upstream end of the rotor with respect to an axial flow direction of core gases, with a disk recess portion forming an annular recess around the axial center of the rotor, wherein
    a flange outer peripheral face is disposed on an outer periphery of the flange, is formed on an upstream end of the rotor blade rotary disk with respect to an axial flow direction of core gases and is parallel to the axial center of the rotor, the flange outer peripheral face is tightly sealed with a disk recess inner peripheral face opposing the flange outer peripheral face to form a wall of an air passage providing cooling air to turbine blades and to reduce air leakage from the air passage, wherein the disk recess inner peripheral face, disposed in the disk recess portion, is parallel to the axial center of the rotor, and is formed around the axial center in an annular shape,
    the flange outer peripheral face is placed on an outer peripheral side of the disk recess portion and is secured to the rotor blade disk at the outer peripheral side of the disk recess portion, and the portion of the flange in contact with the rotary disk is entirely in face to face contact with the rotary disk.

6. The mounting structure according to claim 1, wherein a minimum interference between the flange and the disk recess portion is the difference between a flange minimum outer diameter and a disk recess maximum inner diameter.

7. The mounting structure according to claim 1, wherein the flange outer peripheral face is secured to the rotor blade disk by a bolt.

8. The mounting structure of the gas turbine according to claim 5, wherein the flange outer peripheral face is secured to the rotor blade disk by a bolt.

* * * * *